(12) United States Patent
Theoleyre

(10) Patent No.: US 7,338,561 B2
(45) Date of Patent: *Mar. 4, 2008

(54) METHOD OF PREPARING GRANULATED SUGAR FROM AN AQUEOUS SUGAR SOLUTION CONTAINING MONOVALENT AND POLYVALENT ANIONS AND CATIONS

(75) Inventor: Marc-Andrè Theoleyre, Paris (FR)

(73) Assignee: Applexion (FR)

( * ) Notice: Subject to any disclaimer, the term of this patent is extended or adjusted under 35 U.S.C. 154(b) by 202 days.

This patent is subject to a terminal disclaimer.

(21) Appl. No.: 10/526,825

(22) PCT Filed: Aug. 27, 2003

(86) PCT No.: PCT/FR03/02593

§ 371 (c)(1),
(2), (4) Date: Oct. 7, 2005

(87) PCT Pub. No.: WO2004/022788

PCT Pub. Date: Mar. 18, 2004

(65) Prior Publication Data

US 2006/0107946 A1 May 25, 2006

(30) Foreign Application Priority Data

Sep. 6, 2002 (FR) .................. 02 11042

(51) Int. Cl.
*C13D 3/14* (2006.01)
*C13J 1/06* (2006.01)

(52) U.S. Cl. .................................... 127/46.2

(58) Field of Classification Search ........... 127/46.2, 127/55

See application file for complete search history.

(56) References Cited

U.S. PATENT DOCUMENTS

| 2,937,959 A | | 5/1960 | Reents et al. |
| 5,254,174 A | | 10/1993 | Hansen et al. |
| 5,443,650 A | | 8/1995 | Saska et al. |
| 5,932,106 A | | 8/1999 | San Miguel Bento |
| 6,383,540 B1 | * | 5/2002 | Noel .......................... 426/271 |
| 6,475,390 B1 | * | 11/2002 | Durham et al. ............. 210/650 |
| 7,067,014 B2 | * | 6/2006 | Theoleyre .................. 127/46.2 |

FOREIGN PATENT DOCUMENTS

| JP | 63-177800 | 7/1988 |
| WO | WO 99/04903 | 2/1999 |

* cited by examiner

*Primary Examiner*—David M Brunsman
(74) *Attorney, Agent, or Firm*—Gerald E. Hespos; Anthony J. Casella

(57) ABSTRACT

A purification method employs nanofiltration of an aqueous solution containing one or several sugars, multivalent cations, monovalent metal cations, monovalent anions and multivalent inorganic anions and/or organic acid anions. The method includes replacement of at least a part of said multivalent cations and/or said multivalent inorganic anions and organic acid anions respectively by monovalent metal cations and/or monovalent anions to produce a solution. Nanofiltration of the solution is carried out to obtain a retentate, and at least part of the retentate is subject to crystallization.

20 Claims, 1 Drawing Sheet

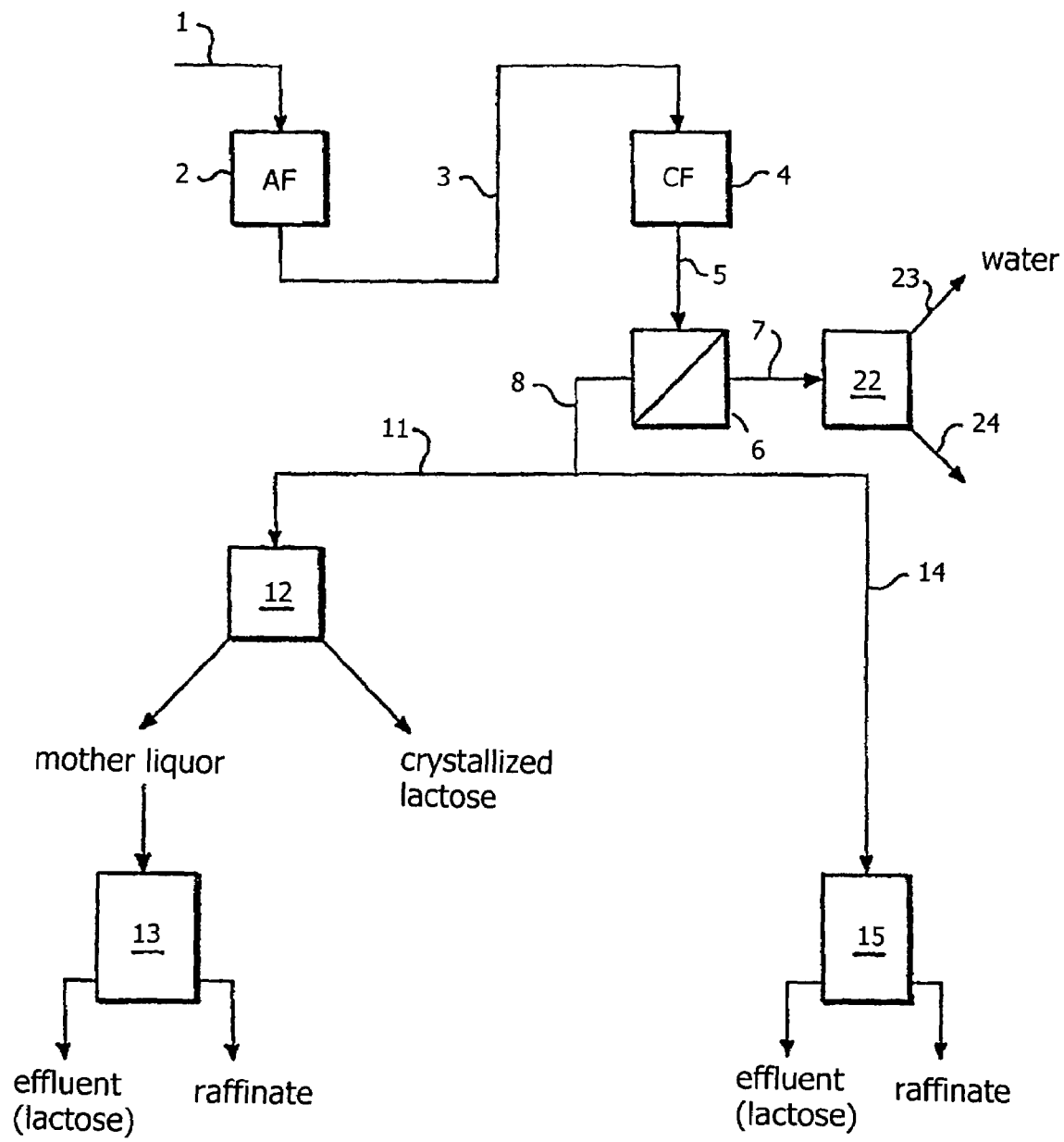

METHOD OF PREPARING GRANULATED SUGAR FROM AN AQUEOUS SUGAR SOLUTION CONTAINING MONOVALENT AND POLYVALENT ANIONS AND CATIONS

This application is a 371 of PCT/FR03/02593, filed 27 Aug. 2003.

BACKGROUND OF THE INVENTION

1. Field of the Invention

The present invention relates to a preparation method of crystallized sugar from an aqueous solution containing one or several sugars, multivalent cations, monovalent metal cations, monovalent anions and multivalent inorganic anions and/or organic acid anions, with prior purification of this aqueous solution by nanofiltration.

2. Description of the Related Art

The purification by demineralization of liquid products (such as a glucose syrup, sweet juices or whey) by means of ion-exchange resins has been known for many years.

The principle of such a demineralization is to make such liquid product percolate through a cationic resin and an anionic resin, the counter-ion of the former being the $H^+$ ion and the counter-ion of the latter, the $OH^-$ ion.

While passing through the cationic resin, the cations of the liquid product are exchanged with the $H^+$ ions of the resin, and while passing through the anionic resin, the anions of the product are exchanged with the $OH^-$ ions of this resin, the $H^+$ and $OH^-$ ions thus released from said resins combining together to give water.

The regeneration of the resins thus used is performed by passage of an acid on the cationic resin and of a base on the anionic resin, and according to the regeneration outputs, the regeneration effluents can contain up to 2 to 3 times the inorganic load extracted from the treated liquid product.

Such highly saline effluents constitute indisputably a source of pollution.

In short, the demineralization of liquids containing inorganics by means of ion-exchange resins calls for the use of an acid and of a base for their regeneration. Besides the cost of these chemicals, this demineralization procedure produces pollutant saline effluents, and of which the processing is onerous.

Moreover, the nanofiltration technique is generally used as a pre-concentration means of aqueous solutions containing inorganics. The monovalent ions of these inorganics migrate through the nanofiltration membrane and therefore most of them are found in the permeate, whereas their multivalent ions are retained by this membrane and most of them are found concentrated in the retentate; a purification effect by demineralization is thus obtained, which remains however insufficient.

SUMMARY OF THE INVENTION

The aim of the present invention is the development of a preparation method of crystallized sugar comprising a prior purification, economical in energy and in chemicals and limiting the quantity and the number of produced effluents.

The basic idea of this method lies in the modification of the ionic composition, without demineralization, of the aqueous solution to be treated in order to improve the demineralization effect of a nanofiltration carried out on the aqueous solution thus modified.

Thus, the present invention relates to a preparation method of crystallized sugar from an aqueous solution containing one or several sugars, multivalent cations, monovalent metal cations, monovalent anions and multivalent inorganic anions and/or organic acid anions, such as lactate or citrate, characterized in that it comprises the operations:

(a) of replacing at least a part of said multivalent cations and/or of said multivalent inorganic anions and organic acid anions by monovalent metal cations and/or monovalent anions, respectively, in order to obtain an aqueous solution depleted in multivalent cations and/or multivalent inorganic anions and organic acid anions, and containing said monovalent metal cations and/or said monovalent anions, and (b) of nanofiltration of the solution resulting from operation (a) in order to obtain as a retentate, a sugar aqueous juice enriched in sugars, in multivalent cations and in multivalent inorganic anions and/or in organic acid anions, and as a permeate, an aqueous effluent containing most of the monovalent anions and monovalent metal cations, (c) of crystallization of at least a part of the retentate resulting from operation (b), in order to obtain crystallized sugar and a mother liquor enriched in monovalent anions and monovalent metal cations.

Operation (a) above provides an aqueous solution enriched in monovalent anions and/or monovalent metal cations and greatly depleted in multivalent cations and in multivalent inorganic anions and/or organic acid anions.

During operation (b), the sugars of the aqueous solution resulting from operation (a) are found in the retentate in which are also principally found the remaining multivalent cations and multivalent inorganic anions and/or organic acid anions. As for the monovalent ions, most of them are found in the permeate.

It is to be noted that thanks to prior operation (a), which does not constitute in itself a demineralization operation, the proportion of the monovalent ions relatively to the multivalent ions and organic acid anions is increased in the aqueous solution, which causes an increase of the demineralization rate of said aqueous solution during operation (b).

When one tries to preferably eliminate the multivalent cations present in the aqueous solution to be purified, in operation (a) the replacement of the multivalent cations is advantageously performed simultaneously to the replacement of the multivalent inorganic anions and/or organic acid anions, or still more advantageously performed on the aqueous solution having beforehand undergone the replacement of the multivalent inorganic anions and/or organic acid anions.

Moreover, when one tries to preferably eliminate the multivalent inorganic anions and/or organic acid anions present in the aqueous solution to be purified, in operation (a) the replacement of the multivalent inorganic anions and/or organic acid anions is advantageously performed simultaneously to the replacement of the multivalent cations or still more advantageously performed on the aqueous solution having beforehand undergone the replacement of the multivalent cations.

According to a preferred embodiment of the invention, replacement operation (a) comprises the processing of the aqueous solution with a cationic resin of which the counter-ion is a monovalent metal cation and/or with an anionic resin of which the counter-ion is a monovalent anion.

Moreover, the monovalent metal cation forming the counter-ion of the cationic resin and the monovalent anion forming the counter-ion of the anionic resin are preferably of the same type as said monovalent metal cations and said monovalent anions, respectively present in the initial aqueous solution; this prevents the introduction of foreign ions in the process and makes more advantageous, as it will be seen below, the regeneration operations of the aforementioned cationic and anionic resins.

According to an important characteristic of the present invention, this method preferably further comprises an operation:

(d) of regeneration of the cationic and/or anionic resins, particularly by processing the same by a permeate obtained during nanofiltration operation (b) above, this permeate being concentrated beforehand at the desired degree.

In proceeding that way, we make use, for the regeneration, of the monovalent ions initially present in the aqueous solution to be purified; this prevents the use of costly chemicals foreign to the method and limits the production of polluting effluents.

According to various alternatives, the method according to the invention can further comprise one or several of the following operations:

(e) chromatography of at least a part of the mother liquor produced by crystallization operation (c), in order to obtain an effluent enriched in sugar and a raffinate enriched in monovalent anions and monovalent metal cations;

(f) chromatography of a part of the retentate resulting from operation (b), in order to obtain an effluent enriched in sugar and a raffinate enriched in monovalent anions and monovalent metal cations; and (g) processing of the permeate resulting from operation (b), by reverse osmosis or electrodialysis in order to produce water and an aqueous fraction enriched in monovalent anions and monovalent metal cations.

It will be noted that according to another characteristic of the method of the present invention, the cationic resin and/or anionic resin can be regenerated by processing it/them with at least one of the following liquids, possibly concentrated, combined to a part of the permeate obtained during operation (b): mother liquor obtained during operation (c), raffinate obtained during operation (e), raffinate obtained during operation (f), aqueous fraction obtained during operation (g).

The method according to the invention can be used in particular for the purification of a whey, of a permeate resulting from the ultrafiltration of a whey or of a juice of sugar beetroot, sugarcane, chicory or Jerusalem Artichokes, this whey, permeate or juice comprising $Ca^{2+}$ and $Mg^{2+}$ ions, $Cl^-$ anions, $Na^+$ or $K^+$ cations and anions selected mainly in the group consisting of phosphate and sulfate anions, anions from organic acids and their mixtures.

BRIEF DESCRIPTION OF THE DRAWING

The present invention is illustrated hereafter, in a non limitative manner, by the description of a purification example, done with reference to the unique FIGURE which is the schematic representation of an installation for the carry out of the method according to the invention.

DETAILED DESCRIPTION OF THE PREFERRED EMBODIMENT

The aqueous solution subject to this method is in the selected example a permeate obtained by ultrafiltration of a whey. Such a permeate comprises mainly lactose, organic acids and inorganics (particularly $Na^+$, $K^+$, $Ca^{2+}$, $Mg^{2+}$ cations, $Cl^-$ and phosphate anions and organic acid anions, such as citrate and lactate).

This permeate is carried by a duct 1 to the entrance of a column 2 filled with a strong anionic resin (AF), then from the exit of this column 2 by a duct 3 to the entrance of a column 4 filled with a strong cationic resin (CF).

The strong cationic resin is in the $Na^+$ or $K^+$ form, i.e. its counter-ion is the $Na^+$ or $K^+$ ion; the strong anionic resin is in the $Cl^-$ form, i.e. its counter-ion is the $Cl^-$ ion.

It will be noted that, as an alternative, both these resins could be used in a mixture, in which case a single column would be sufficient.

During the migration of the permeate through the anionic resin, it exchanges its multivalent inorganic anions (phosphate) and organic acid anions (lactate, citrate) with the $Cl^-$ ions of the resin; during its migration through the cationic resin, it exchanges its multivalent cations ($Ca^{2+}$, $Mg^{2+}$) with the $Na^+$ or $K^+$ ions of the resin.

The permeate is therefore relieved from a substantial part of its multivalent cations and multivalent inorganic anions and of its organic acid anions, which cations and anions have been replaced by monovalent cations and anions; this permeate therefore mainly contains lactose, $Na^+$, $K^+$ and $Cl^-$ ions, residual $Ca^{2+}$, $Mg^{2+}$ cations, residual phosphate anions and residual organic acid anions.

The aqueous solution coming from column 4 is then carried by a duct 5 in a nanofiltration device 6 comprising one or some nanofiltration membranes permeable to the monovalent ions, but retaining the lactose, the multivalent ions and the organic acid ions.

Thus, are coming from device 6:
on one hand, by duct 7, a permeate enriched in $Cl^-$, $Na^+$ and $K^+$ ions, and
on the other hand, by duct 8, a retentate enriched in lactose and in phosphate anions, anions from residual organic acids and residual $Ca^{2+}$ and $Mg^{2+}$ cations; this retentate further contains a small quantity of $Na^+$, $K^+$ and $Cl^-$ ions.

Moreover, a part of the nanofiltration retentate is subject to a crystallization. For this purpose, a branching 11 is provided on duct 8, this branching 11 leading to a crystallization unit 12 where are produced crystallized lactose and a mother liquor containing most of the minerals (particularly $Na^+$, $K^+$ and $Cl^-$).

If desired, at least a part of this mother liquor can be subject to a chromatography in a chromatography column 13, in order to obtain on one hand, an effluent enriched in lactose and a raffinate enriched in minerals (mainly $Na^+$, $K^+$ and $Cl^-$).

Further, another part of the nanofiltration retentate can be subject to a chromatography. For this purpose, a second branching 14 is provided on duct 8, this branching leading to the entrance of a chromatography column 15. Is extracted from the latter, on one hand, an effluent enriched in lactose, and on the other hand a raffinate enriched in inorganics (mainly $Na^+$, $K^+$ and $Cl^-$).

It will be noted that the nanofiltration permeate removed through duct 7, can be treated in a reverse osmosis unit 22 in order to obtain, on one hand, water extracted by duct 23, and on the other hand, an aqueous fraction (removed through duct 24) concentrated in $Na^+$, $K^+$ and $Cl^-$ ions.

As it is evident from the foregoing, we have a whole range of liquids produced during the method and advantageously usable, if necessary after concentration, for the regeneration of the strong cationic resin and of the strong anionic resin filling columns 2 and 4.

That is:
   a fraction of the nanofiltration permeate removed through duct 7,
   the saline aqueous fraction removed from the reverse osmosis unit by duct 24,
   a fraction of the nanofiltration retentate,
   the mother liquor from crystallization unit 12,
   raffinates from chromatography units 13 and 15.

It will be specified that according to the monovalent $Na^+$, $K^+$ and $Cl^-$ cations and anions content of these different liquids usable for the regeneration of the resins of columns 2 and 4, this regeneration will be able to be performed either in series or in parallel.

It will be noted however that the regeneration in parallel is especially preferred because it prevents all risk of precipitation of insoluble salts, such as the calcium phosphate, on the strong cationic resin present in column 4.

However, the regeneration in series of both resins is possible on the condition that the pH is controlled in order to prevent any risk of precipitation on the resins.

Moreover, the table hereafter shows the influence of the type of decalcification prior to the nanofiltration on the performance of this nanofiltration, the liquid treated being a permeate resulting from the ultrafiltration of a whey (designated whey permeate in this table), the nanofiltration concentration factor being of 4 and the nanofiltration membrane being of the type DESAL 5, from the American company OSMONICS.

TABLE

|  | Whey permeate | Nanofiltration retentate | | |
|---|---|---|---|---|
|  |  | Control | CF | AF then CF |
| Dry matter (g/l) | 50.0 | 187 | 187 | 187 |
| total cations (eq./kg of dry matter) | 1.7 | 1.22 | 1.14 | 0.90 |
| total reduction rate of the cations (%) |  | 28 | 33 | 47 |

Control: total absence of decalcification before the nanofiltration
CF decalcification by passage through a strong cationic resin (SR1 LNA from American company Rohm and Haas).
AF then CF: decalcification by serial passage through a strong anionic resin (IRA 458 from American company Rohm and Haas) then through a strong cationic resin.

The data contained in this table show that the total reduction rate of the cations is increased when only the CF system is used, and particularly increased when the AF-CF system is used; this table therefore shows the strong influence on the performances of the nanofiltration of a prior reduction of the content in multivalent cations, in multivalent inorganic anions and in organic acid anions suited to form complexes with said multivalent cations.

The invention claimed is:

1. Preparation method of crystallized sugar from an aqueous solution containing one or several sugars, multivalent cations, monovalent metal cations, monovalent anions and multivalent inorganic anions and/or organic acid anions, characterized in that it comprises operations:
   (a) of replacement of at least a part of said multivalent cations and/or of said multivalent inorganic anions and organic acid anions by monovalent metal cations and monovalent anions, respectively, in order to obtain an aqueous solution depleted in multivalent cations and/or multivalent inorganic anions and organic acid anions, and containing the said monovalent metal cations and monovalent anions,
   (b) of nanofiltration of the solution resulting from operation (a) in order to obtain as a retentate, a sugar aqueous juice enriched in sugars, in multivalent cations and in multivalent inorganic anions and/or in organic acid anions, and as a permeate, an aqueous effluent enriched in monovalent anions and monovalent metal cations, and
   (c) of crystallization of at least a part of the retentate resulting from operation (b), in order to obtain crystallized sugar and a mother liquor enriched in monovalent anions and monovalent metal cations.

2. Method according to claim 1, characterized in that the replacement operation of the multivalent cations is performed simultaneously to the replacement operation of the multivalent inorganic anions and/or organic acid anions, or performed on the aqueous solution having undergone beforehand the replacement operation of the multivalent inorganic anions and/or organic acid anions.

3. Method according to claim 2, characterized in that the replacement operation (a) comprises the processing of the aqueous solution with a cationic resin of which the counter-ion is a monovalent metal cation and/or with an anionic resin of which the counter-ion is a monovalent anion.

4. Method according to claim 3, characterized in that it further comprises an operation:
   (d) of regeneration of the cationic resin and/or of the anionic resin.

5. Method according to claim 1, characterized in that the replacement operation of the multivalent inorganic anions and/or organic acid anions is performed simultaneously to the replacement operation of the multivalent cations or performed on the aqueous solution having undergone beforehand the replacement operation of the multivalent cations.

6. Method according to claim 5, characterized in that the replacement operation (a) comprises the processing of the aqueous solution with a cationic resin of which the counter-ion is a monovalent metal cation and/or with an anionic resin of which the counter-ion is a monovalent anion.

7. Method according to claim 6, characterized in that the monovalent metal cation forming the counter-ion of the cationic resin and the monovalent anion forming the counter-ion of the anionic resin are of the same type as said monovalent metal cations and said monovalent anions present in the initial aqueous solution, respectively.

8. Method according to claim 7, characterized in that it further comprises an operation:
   (d) of regeneration of the cationic resin and/or of the anionic resin.

9. Method according to claim 8, characterized in that regeneration operation (d) comprises the processing of the cationic resin and/or of the anionic resin with permeate obtained during nanofiltration operation (b), after its concentration to the desired degree.

10. Method according to claim 9, characterized in that it further comprises the operation:
    (e) of chromatography of at least a part of the mother liquor produced by crystallization operation (c), in order to obtain an effluent enriched in sugar and a raffinate enriched in monovalent anions and monovalent metal cations.

11. Method according to claim 10, characterized in that it further comprises the operation:
    (f) of chromatography of a part of the retentate resulting from operation (b), in order to obtain an effluent enriched in sugar and a raffinate enriched in monovalent anions and monovalent metal cations.

12. Method according to claim 11, characterized in that it further comprises the operation:
   (g) of processing of the permeate resulting from operation (b), by reverse osmosis or electrodialysis in order to produce water and an aqueous fraction enriched in monovalent anions and monovalent metal cations.

13. Method according to claim 12, characterized in that it further comprises the operation:
   of regeneration of the cationic resin and/or of the anionic resin by processing the same with at least one of the following liquids, possibly concentrated, combined to a part of the permeate obtained during operation (b): mother liquor obtained during operation (c), raffinate obtained during operation (e), raffinate obtained during operation (f), aqueous fraction obtained during operation (g).

14. Method according to claim 1, for the purification of a whey, of a permeate resulting from the ultrafiltration of a whey or of a juice of sugar beetroot, sugarcane, chicory or Jerusalem Artichokes, this whey, permeate or juice comprising $Ca^{2+}$ and $Mg^{2+}$ ions, $Cl^-$ anions, $Na^+$ or $K^+$ cations and anions selected mainly in the group consisting of phosphate and sulfate anions, anions from organic acids and their mixtures.

15. Method according to claim 1, characterized in that the replacement operation (a) comprises the processing of the aqueous solution with a cationic resin of which the counter-ion is a monovalent metal cation and/or with an anionic resin of which the counter-ion is a monovalent anion.

16. Method according to claim 15, characterized in that the monovalent metal cation forming the counter-ion of the cationic resin and the monovalent anion forming the counter-ion of the anionic resin are of the same type as said monovalent metal cations and said monovalent anions present in the initial aqueous solution, respectively.

17. Method according to claim 16, characterized in that it further comprises an operation:
   (d) of regeneration of the cationic resin and/or of the anionic resin.

18. Method according to claim 17, characterized in that regeneration operation (d) comprises the processing of the cationic resin and/or of the anionic resin with permeate obtained during nanofiltration operation (b), after its concentration to the desired degree.

19. Method according to claim 1, characterized in that it further comprises the operation:
   (e) of chromatography of at least a part of the mother liquor produced by crystallization operation (c), in order to obtain an effluent enriched in sugar and a raffinate enriched in monovalent anions and monovalent metal cations.

20. Method according to claim 1, characterized in that it further comprises the operation: (f) of chromatography of a part of the retentate resulting from operation (b), in order to obtain an effluent enriched in sugar and a raffinate enriched in monovalent anions and monovalent metal cations.

* * * * *